United States Patent [19]

Medina

[11] Patent Number: 5,358,408
[45] Date of Patent: Oct. 25, 1994

[54] TISSUE SPECIMEN SUSPENSION DEVICE

[76] Inventor: Marelyn Medina, 81 Browning Ave., Nashua, N.H. 03062

[21] Appl. No.: 28,325

[22] Filed: Mar. 9, 1993

[51] Int. Cl.$^5$ ............................................. G09B 23/28
[52] U.S. Cl. ...................................... 434/262; 434/267
[58] Field of Search ......................... 434/262, 267, 269

[56] References Cited

U.S. PATENT DOCUMENTS

| | | | |
|---|---|---|---|
| 3,339,290 | 9/1967 | Doyle | 434/267 |
| 3,775,865 | 12/1973 | Rowan | 434/262 |
| 4,001,952 | 1/1977 | Kleppinger | 434/262 |
| 4,789,340 | 12/1988 | Zikria | 434/272 |
| 5,149,270 | 9/1992 | McKeown | 434/262 |
| 5,230,630 | 7/1993 | Burgett | 434/262 |

OTHER PUBLICATIONS

R. W. Baily, M.D., A. L. Imbembo, M.D. and K. A. Zuker, M.D., *Establishment of a Laparoscopic Cholecystectomy Training Program* pp. 231–236, The American Surgeon, Apr. 1991, vol. 57.

A. G. Gordon and A. L. Magos, *The Development of Laparoscopic Surgery*, Bailliere's Clinical Obstetrics and Gynecology, vol. 3, No. 3 pp. 429–448, Sep. 1988.

G. Berci, J. M. Sackier, and M. Paz-Patlow, *New Ideas and Improved Instrumentation for Laparoscopic Cholecystectomy*, pp. 1–3 Surgical Endoscopy, (1991) 5: 1–3.

B. Buess, M. Naruhn, Th. Mötzung, B. Mentges and H. D. Becker, *Trainingsprogram fur die Minimal-invasive Chirugie* pp. 276–283 Chirurg vol. 62, (1991).

Primary Examiner—Gene Mancene
Assistant Examiner—Cindy A. Cherichetti
Attorney, Agent, or Firm—Wolf, Greenfield & Sacks

[57] ABSTRACT

A device for assisting in the training of laparoscopic surgical techniques is disclosed. The device allows placement of a tissue specimen in different positions and angles that permit the surgeon to practice laparoscopic techniques such as suturing and stapling during laparoscopic simulation exercises.

30 Claims, 11 Drawing Sheets

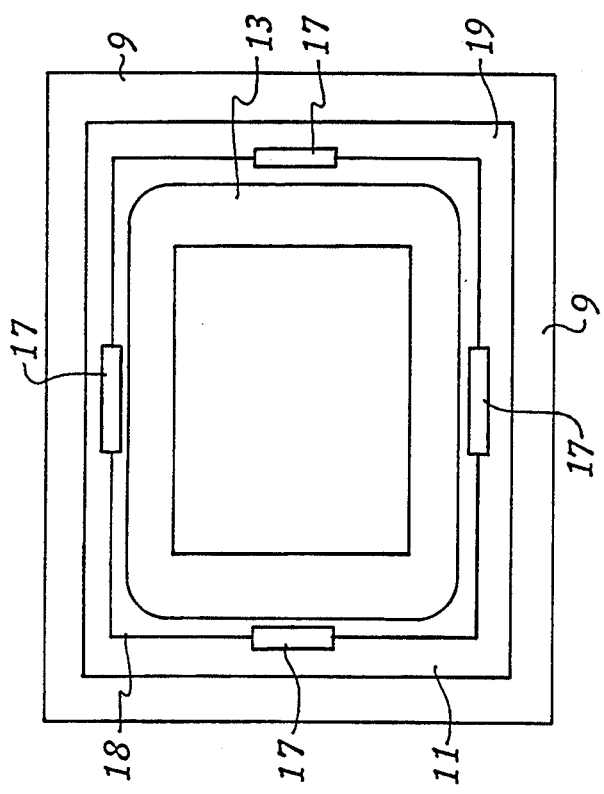
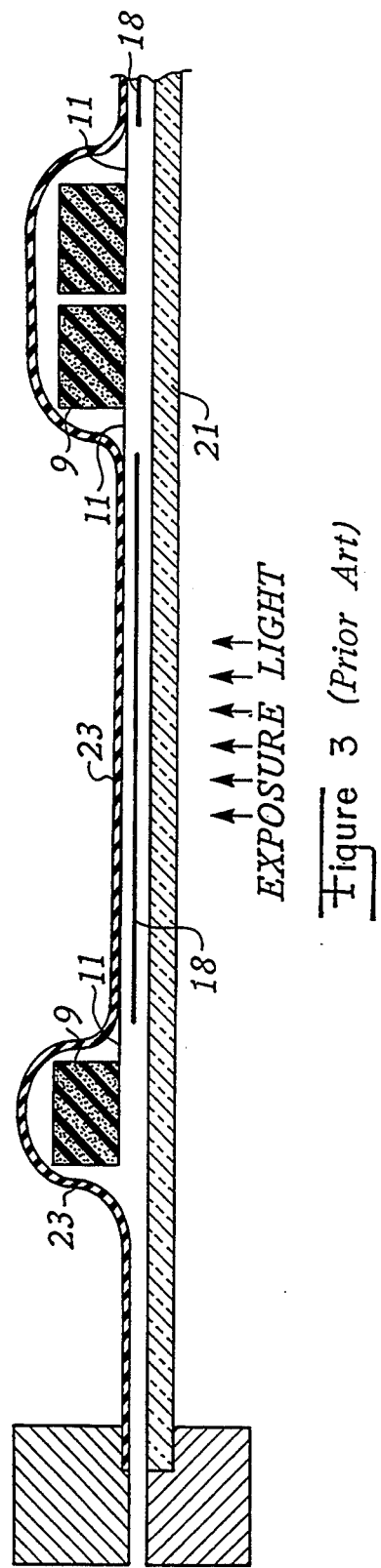
Figure 1 (Prior Art)
Figure 3 (Prior Art)

TISSUE SPECIMEN SUSPENSION DEVICE

FIELD OF THE INVENTION

The invention pertains to a device to assist in teaching laparoscopic surgical techniques.

BACKGROUND OF THE INVENTION

In recent years, laparoscopic surgery has been used in increasingly numerous and complex applications. Unfortunately, laparoscopic techniques require the surgeon to obtain a great deal of training and practice prior to performing laparoscopic surgery upon a human patient. At present, surgeons experience significant difficulty during training for laparoscopic techniques. The current method for surgical training often involves the use of pigs with an elaborate operating room set-up requiring considerable personnel. Additionally the procedure necessitates placing live animals under anesthesia. Typically, two laboratory technicians are needed: one to maintain the animal under proper anesthesia and the other to provide assistance with the surgical equipment. In addition, in a typical laparoscopic training session, at least three surgeons are needed to assist with the equipment and to operate a telescopic video camera that is inserted into the patient.

Unfortunately, such training sessions are expensive and time-consuming while providing only a short period of practice time for each of the surgeons involved. Co-pending U.S. patent application Ser. No. 07/923,221) discloses a laparoscopic training device comprising an aperture that is mounted and positioned above an operating surface in a manner that simulates the surgical opening created in laparoscopic surgery. With the exception of the above-identified co-pending application, there is no satisfactory means to obtain extensive, non-operative experience in handling laparoscopic instruments and performing surgical techniques such as the dissection of tissue planes, knot tying and suturing without a supply of animals and operating equipment and personnel as described above.

Although laparoscopic training devices do exist, the current simulators are less than satisfactory. Typically, these devices, e.g., "pelvic trainers", consist of a rigid box having numerous ports to allow observation, passage of instruments and a video telescope. Small pieces of meat or synthetic organ models are placed within these devices and can serve as surgical models upon which the surgeon can practice simple techniques such as knot tying, grasping and cutting. Typically, a horizontal plane of dissection is used with the specimen laying freely on the floor of the device or tacked in place to prevent movement during manipulation. Although such devices eliminated the need to practice laparoscopic techniques in the operating room environment, they tend to be overly cumbersome while providing a less than satisfactory surgical simulation. Additionally, such devices severely limit the size of the surgical field within which the surgeon may practice.

A need exists for a device which simulates the presentation of tissue at various positions and angles as it is perceived by the surgeon in performing an actual laparoscopic procedure. Accordingly, there is still a need for a laparoscopic training device which would permit positioning a tissue specimen at different angles with respect to a horizontal plane. Preferably, such devices would allow adjustable positioning of the tissue specimen.

SUMMARY OF THE INVENTION

The present invention is configured to compliment current and future simulation training devices by allowing placement of a specimen in different planes and at different angles from the horizontal on which to practice incision placement, suturing or stapling. This variable placement is relevant to clinical situations in which a surgeon may need to repair an abdominal wall defect, such as a hernia, or place sutures in organs such as the uterus, stomach, esophagus, bladder or kidneys. Most of these procedures are performed in non-horizontal planes within the peritoneal cavity.

The problem of teaching surgeons non-horizontal laparoscopic techniques has not been addressed using pelvic trainers. Such training is usually relegated to the live porcine model under anesthesia. The current device permits a greater use of the laparoscopic simulation devices, expanding the number of hours surgeons can practice angular surgical techniques before proceeding to the operating room animal models. The specimens to be placed on the tissue suspending device should preferably be biological (mammalian) tissue such as tripe, or organs such as liver or kidney, to best simulate human tissue. Nonetheless, artificial models, though less satisfactory, can also be used.

The present invention provides an apparatus for maintaining a tissue specimen in a planar or non-planar configuration at pre-selected positions with respect to a horizontal plane. The instant invention simulates the presentation of tissue as it is perceived by the surgeon during the performance of an actual laparoscopic procedure. Accordingly, the invention permits surgeons to practice suturing, stapling and other laparoscopic techniques during laparoscopic simulation exercises under conditions which closely approximate the conditions encountered during performance of an actual laparoscopic procedure.

According to one aspect of the invention, a tissue specimen suspension device includes a mounting member adapted to engage a tissue supporting member. The tissue supporting member is preferably a flexible substrate having a plurality of anchoring sites for anchoring the tissue specimen to the support. In one embodiment, the mounting member is adapted to maintain the tissue supporting member in a planar configuration. In another embodiment, the mounting member is adapted to maintain the tissue supporting member in a non-planar configuration. In the preferred embodiments, the mounting member engages and maintains the tissue supporting member in a manner which permits the user to adjust the position of the tissue supporting member with respect to the position of the mounting member, thus permitting placement of the supporting member (and the tissue specimen attached thereto) at numerous and variable angles with respect to a horizontal plane.

According to another aspect of the invention, the mounting member maintains the tissue supporting member in a planar configuration. The tissue supporting member includes a plurality of anchoring sites adapted to maintain the tissue specimen on an underside of the supporting member to permit, for example, simulated repair of an anterior abdominal wall hernia. The tissue sample can also be placed on the top side of the tissue supporting member, and secured thereto by the securing methods described below.

According to yet another aspect of the invention, a complete laparoscopic training system is provided. The system comprises the tissue suspension device disclosed herein in combination with at least one aperture defining means and a means for allowing the aperture defining means to be positioned above a tissue specimen in a manner which simulates a surgical opening in a laparoscopic surgical procedure.

These and other aspects of the invention will be more apparent with reference to the detailed description of the preferred embodiments and the accompanying drawings.

DETAILED DESCRIPTION OF THE INVENTION

Figure 2:
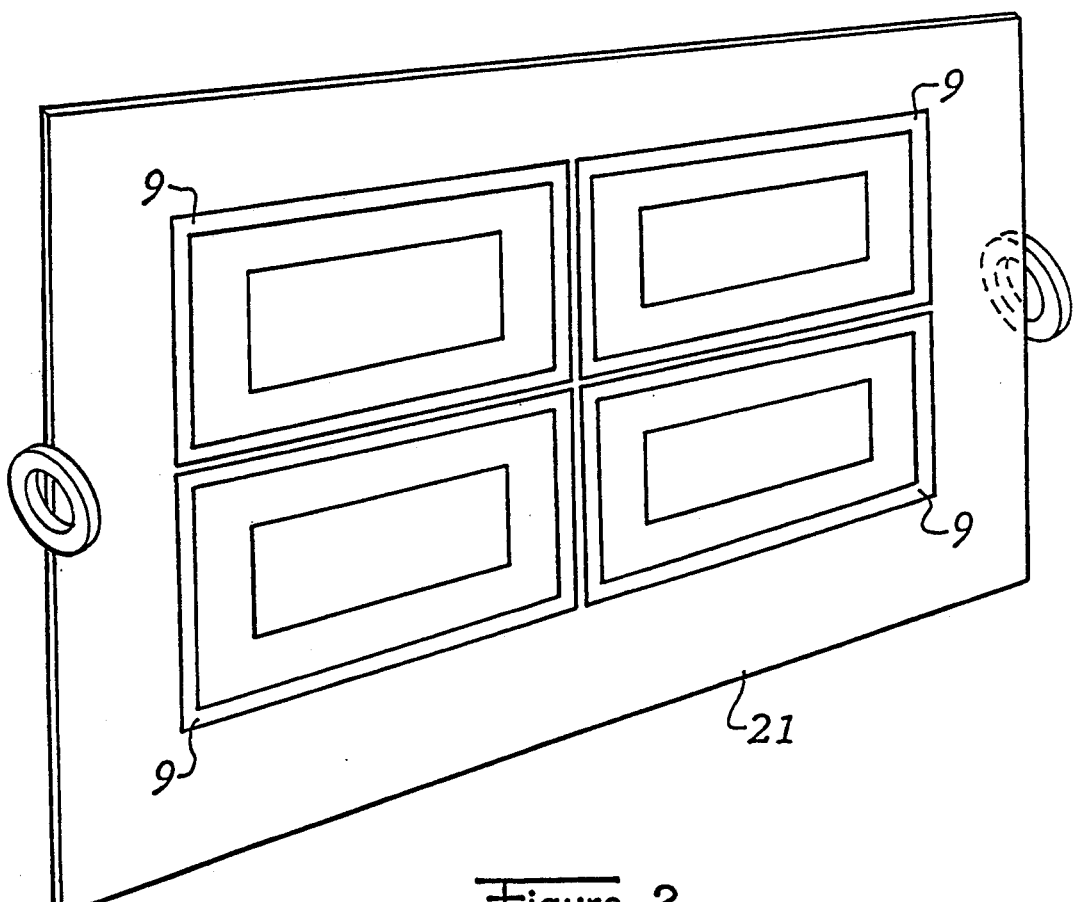
FIG. 2 is a schematic illustration of the embodiment of FIG. 1, shown with a convex mesh tissue supporting member and a tissue specimen attached thereto.

The device of the present invention allows a surgeon to acquire training at his or her convenience, without the assistance of other surgeons, nurses or technicians. In particular, the device allows the surgeon to suspend a planar or non-planar tissue specimen at pre-selected positions with respect to a horizontal plane. Thus, the device permits the surgeon to practice laparoscopic techniques such as suturing and stapling on a tissue specimen suspended at various positions and angles during laparoscopic simulation exercises, without the need for a live animal model. The invention is not meant to replace the live animal model in laparoscopic surgical training, but rather to supplement this model, by providing the surgeon with a device for practicing basic skills, before and after the use of the live animal model.

Various embodiments of the instant invention are disclosed in FIGS. 1-11. In its broadest embodiment, a tissue suspension device 10 comprises a mounting member 12 adapted to engage a tissue supporting member 14 formed of a flexible substrate (see e.g., FIG. 1). The substrate includes a plurality of anchoring sites 16 for attaching a tissue specimen 18 to the supporting member. As used herein, the phrase "anchoring sites" refers to positions on the tissue supporting member to which the tissue specimen can be attached. As discussed in detail below, mounting member 12 is adapted to maintain the tissue supporting member at a plurality of different angles with respect to a horizontal surface 20, thereby providing a means for simulating the presentation of various tissues and structures as perceived by the surgeon during performance of an actual laparoscopic procedure.

With reference to tissue supporting member 14, a material such as a semi-rigid mesh (FIGS. 1, 2, 3, 7, 8 and 10) or a metallic or plastic sheet (FIG. 4), which is capable of being deformed or bent without breaking, is a flexible support within the meaning of the term flexible as used herein. In addition, a self-supporting material, i.e., a material which retains its shape when detached from the mounting member, is an example of a flexible material, provided that the self-supporting material is capable of being deformed or bent without breaking when placed under conditions for mounting the tissue supporting member to the mounting member. However, a more pliant material, such as a woven material or mesh, which is not self-supporting (FIGS. 2 and 6), also is a flexible support. As used herein, the term "mesh" refers to a woven matrix of, for example, wires or other semi-rigid filaments.

Figure 1:
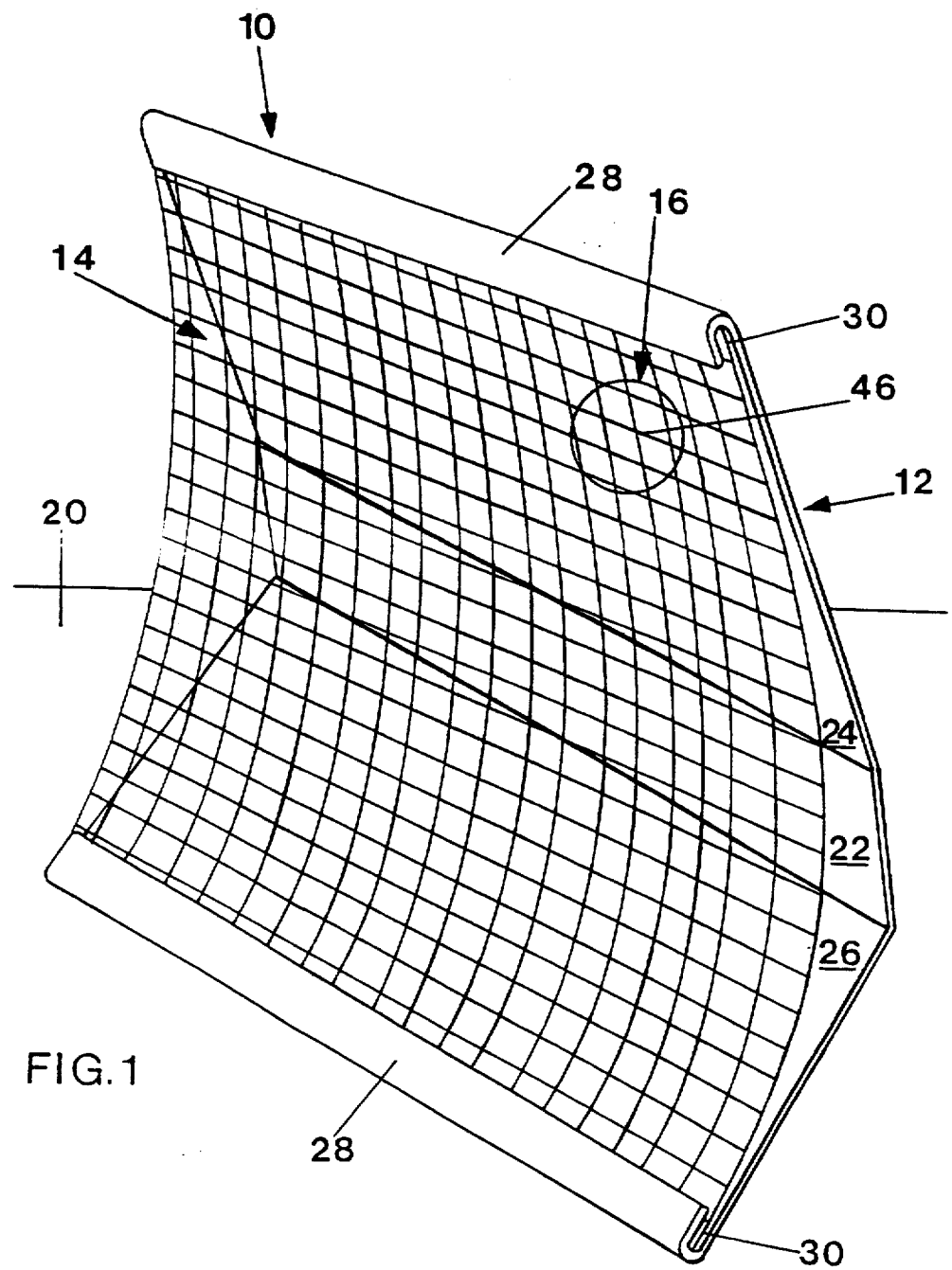
FIG. 1 is a schematic illustration of a first embodiment of a mounting member of the instant invention, shown with a concave mesh tissue supporting member.
Figure 2:
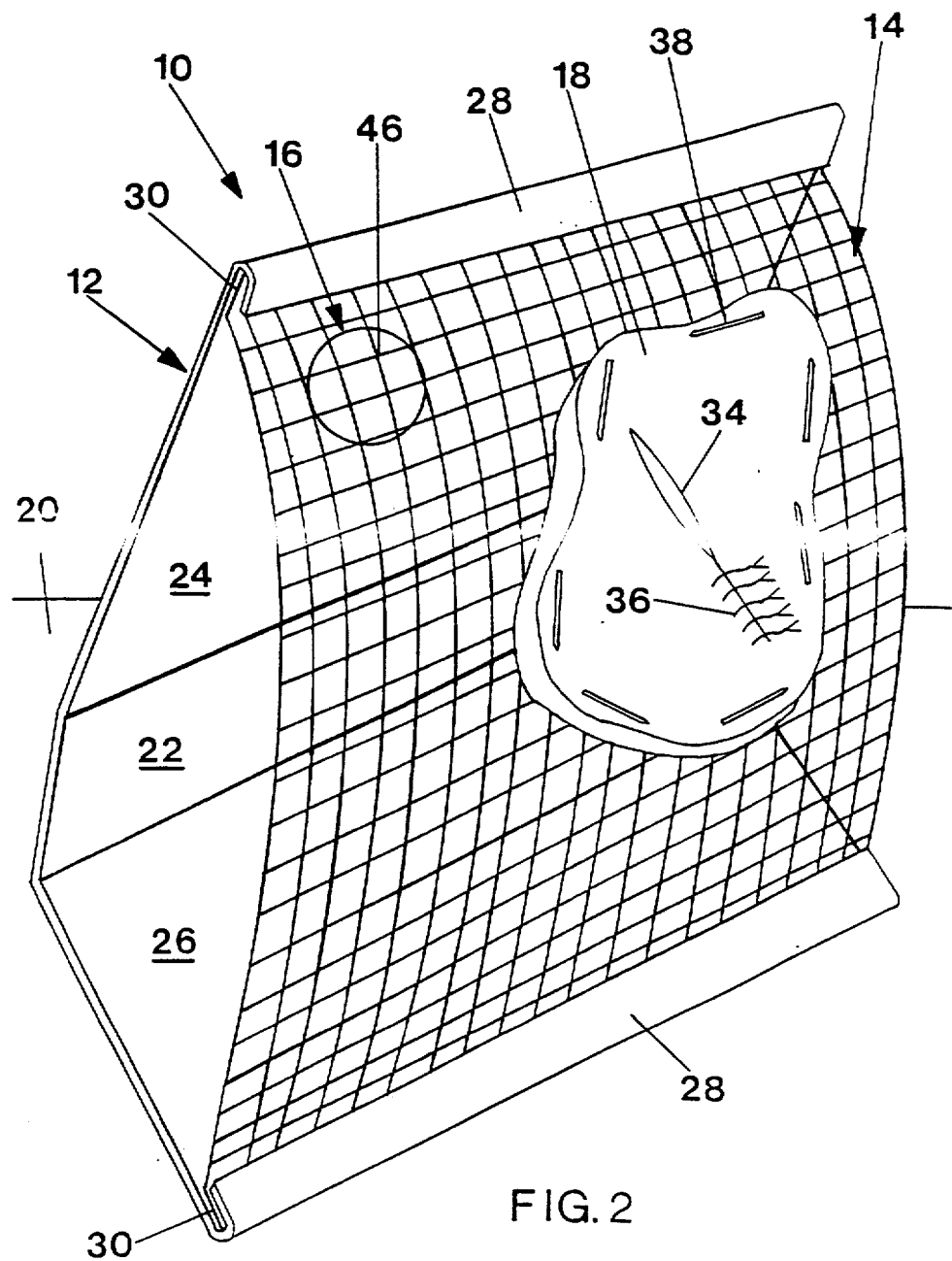

A tissue suspension device 10 including a first embodiment of mounting member 12, adapted to allow removal of tissue supporting member 14, is shown in FIG. 1. Mounting member 12 includes a center wall 22 integral with and positioned between a first side wall 24 and a second side wall 26. Preferably, walls 24, 26 are of different lengths. Each side wall includes a channel 28 adapted to receive and retain an edge 30 of tissue supporting member 14. In a preferred embodiment, the mounting member is formed by folding a sheet of metal into the configuration illustrated in FIGS. 1-4. In an alternative embodiment (FIG. 5), mounting member 12 (shown without tissue supporting member 14) comprises a pair of opposing channels 28 connected by a bridge 32, with one channel attached to horizontal surface 20.

Figure 3:
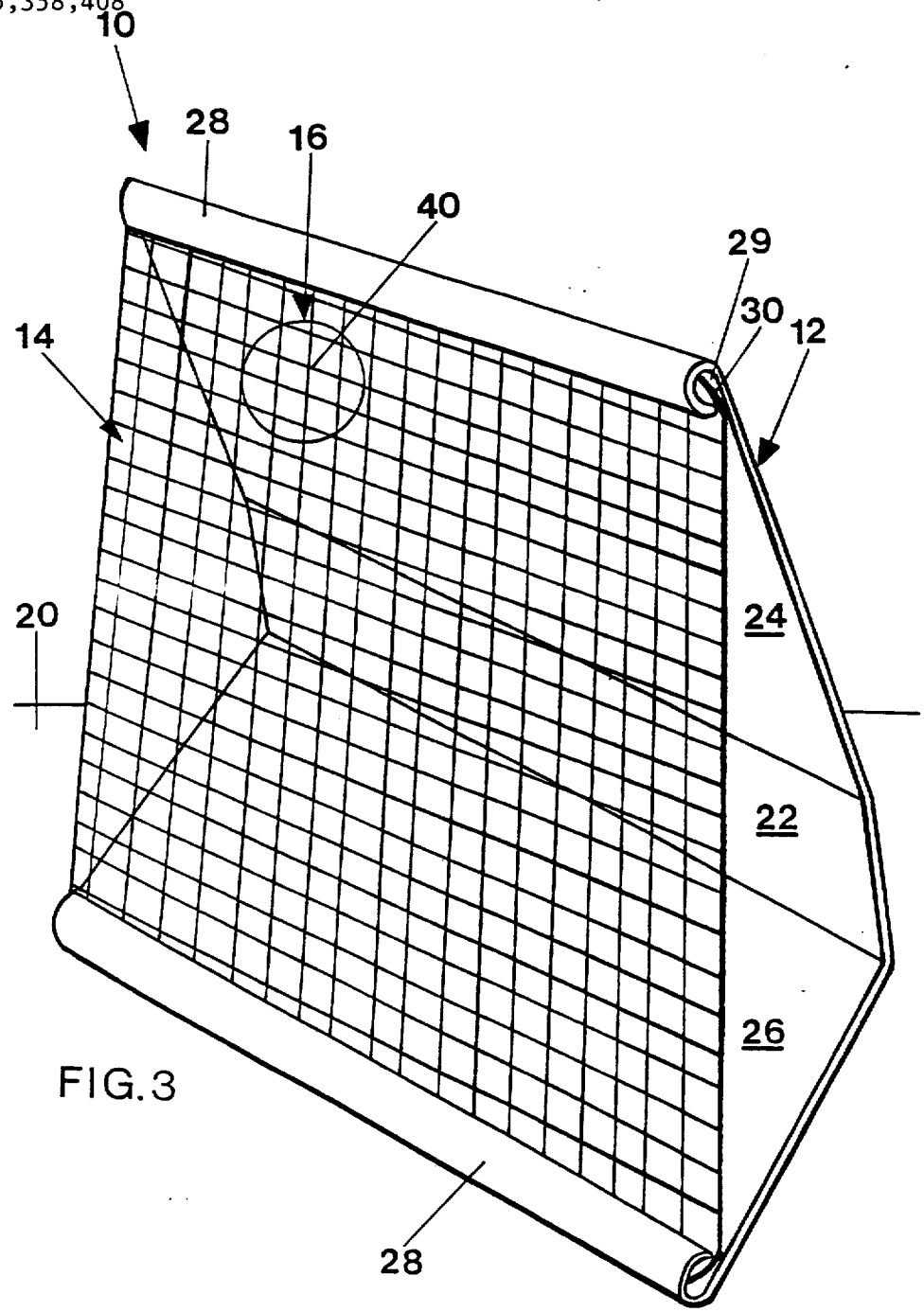
FIG. 3 is a schematic illustration of the embodiment of FIG. 1, shown with a planar mesh tissue supporting member.
Figure 4:
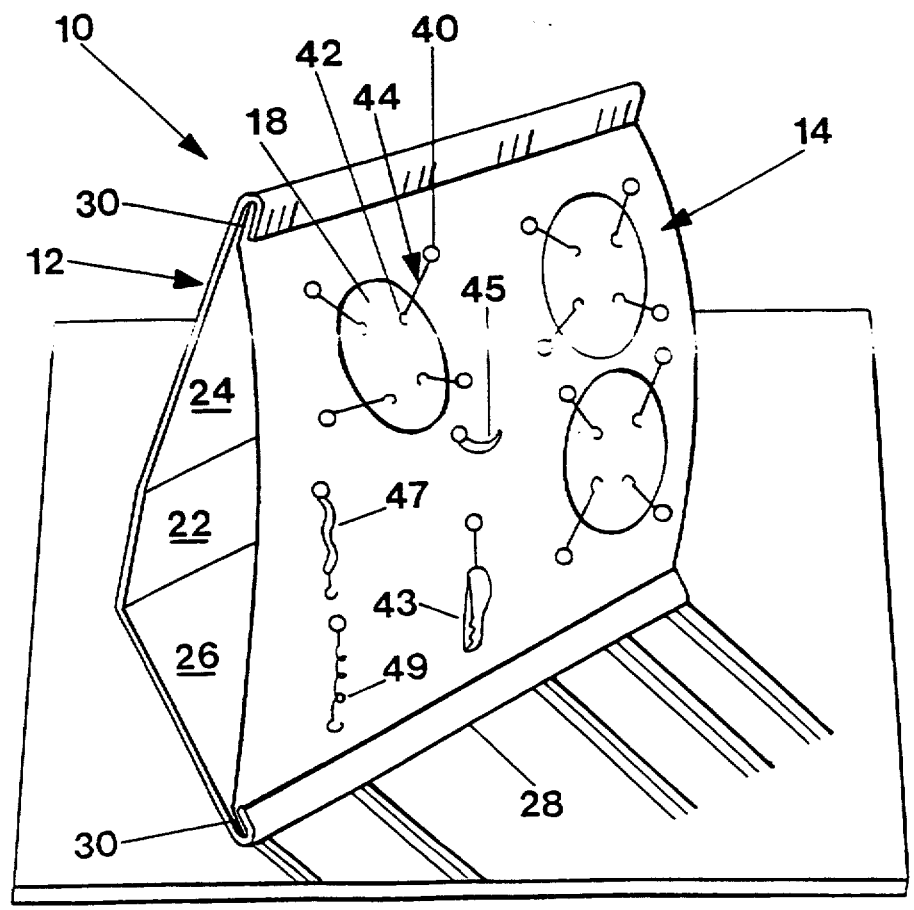
Figure 5:
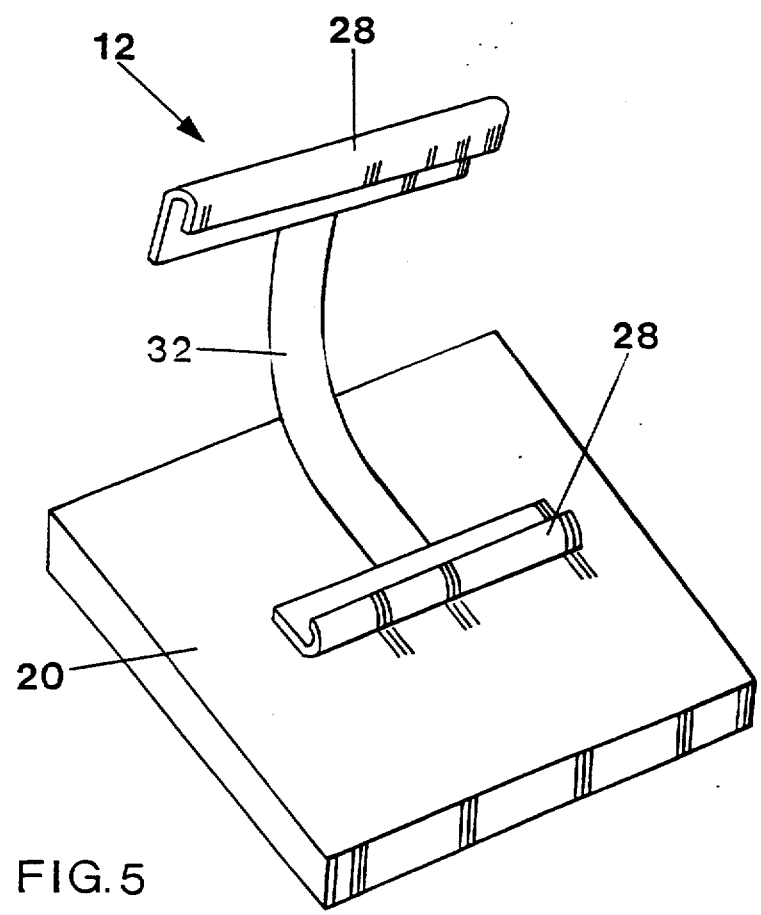
Figure 6:
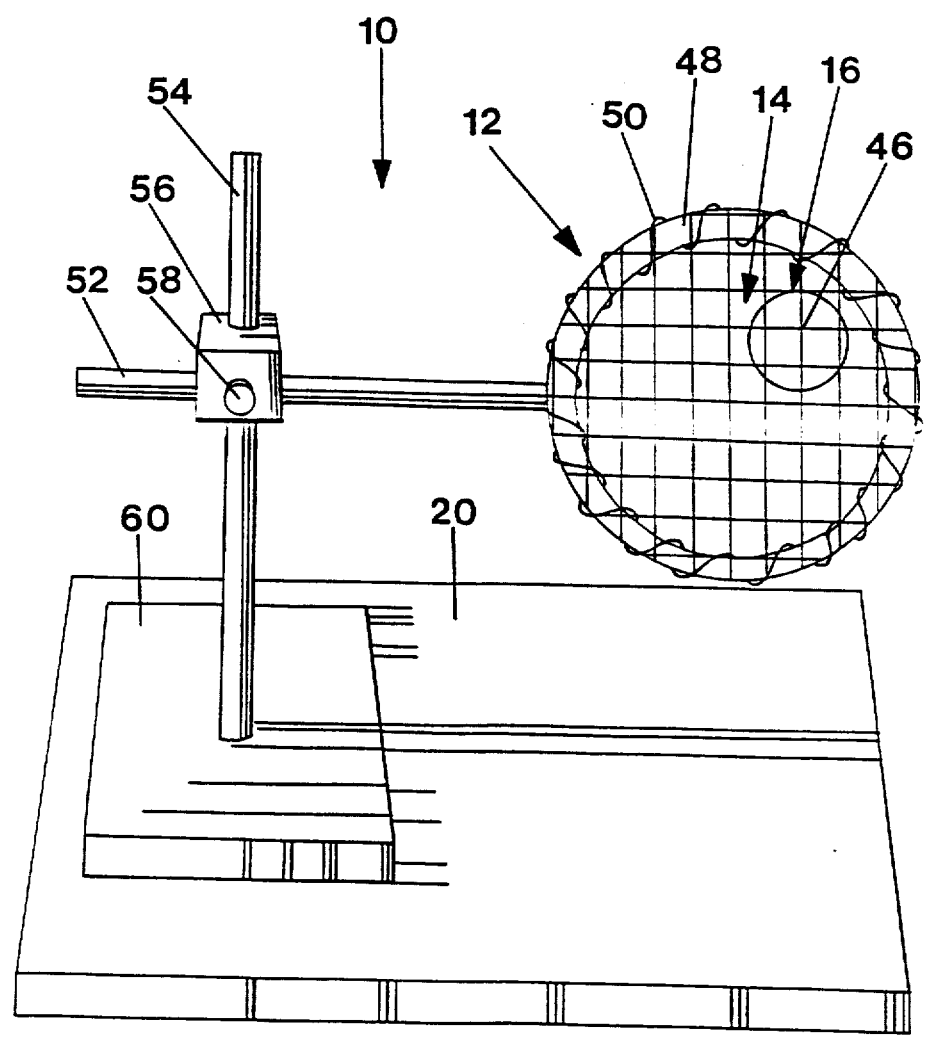
Figure 7:
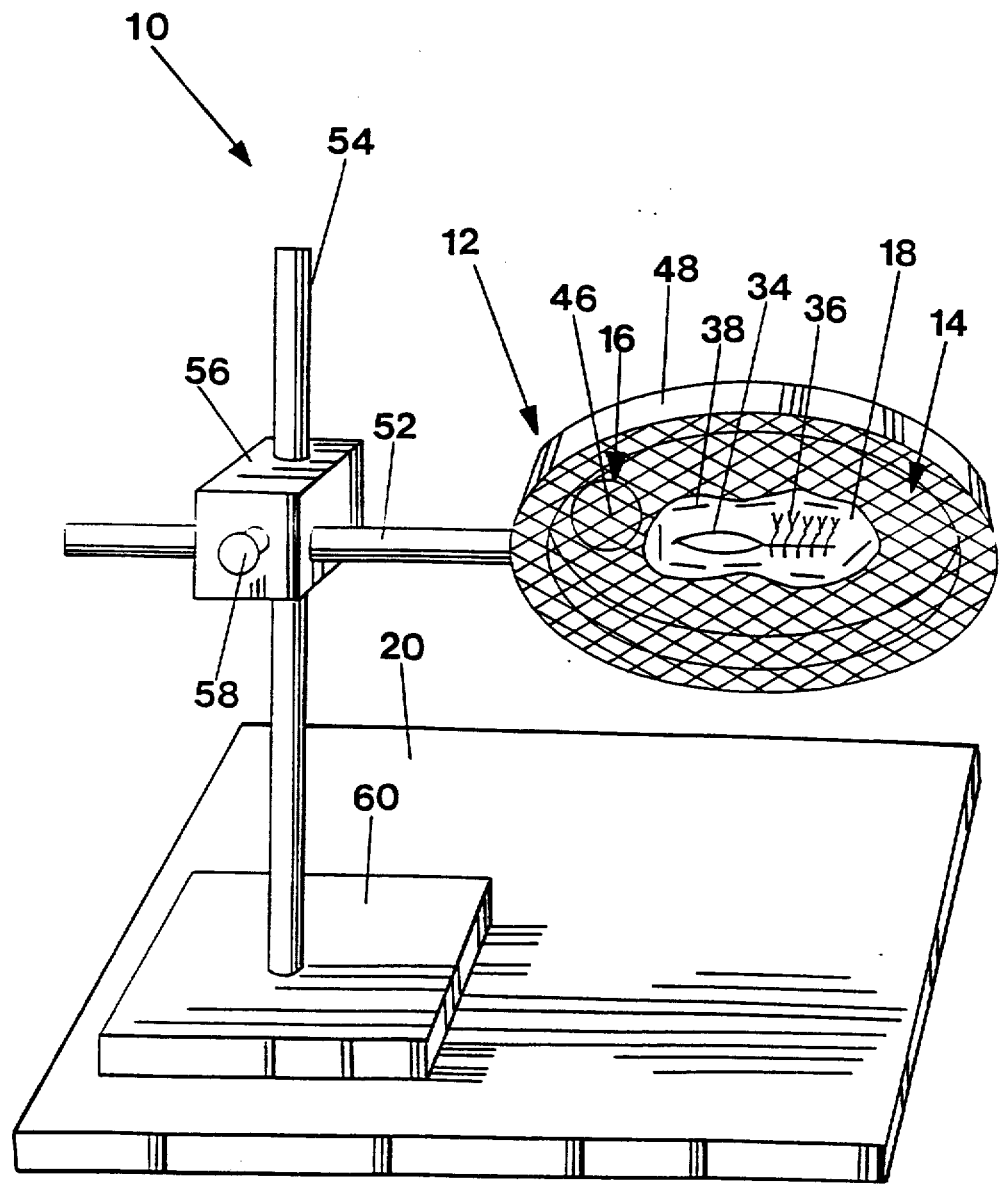
Figure 8:
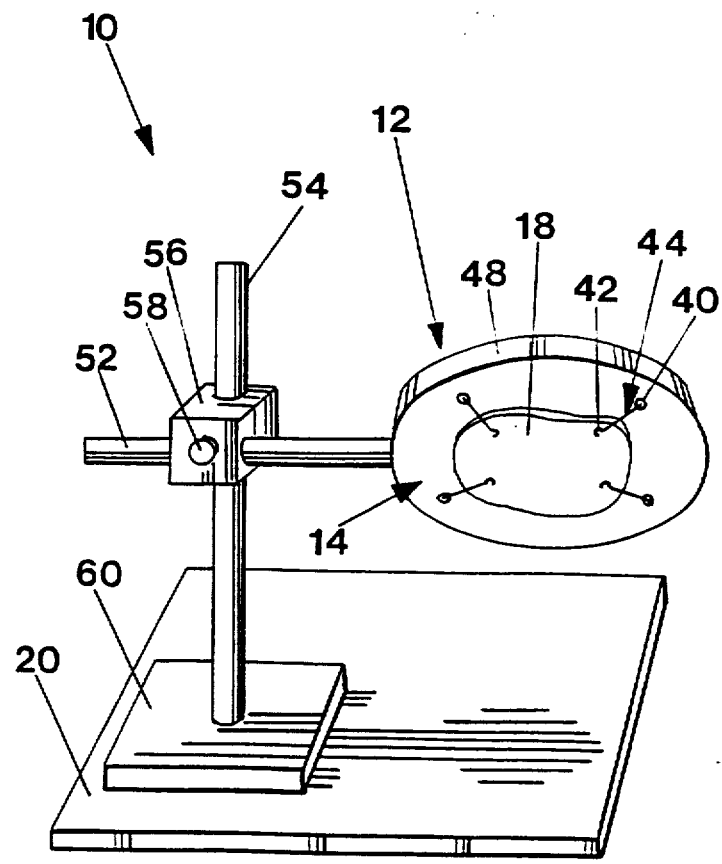
Figure 9:
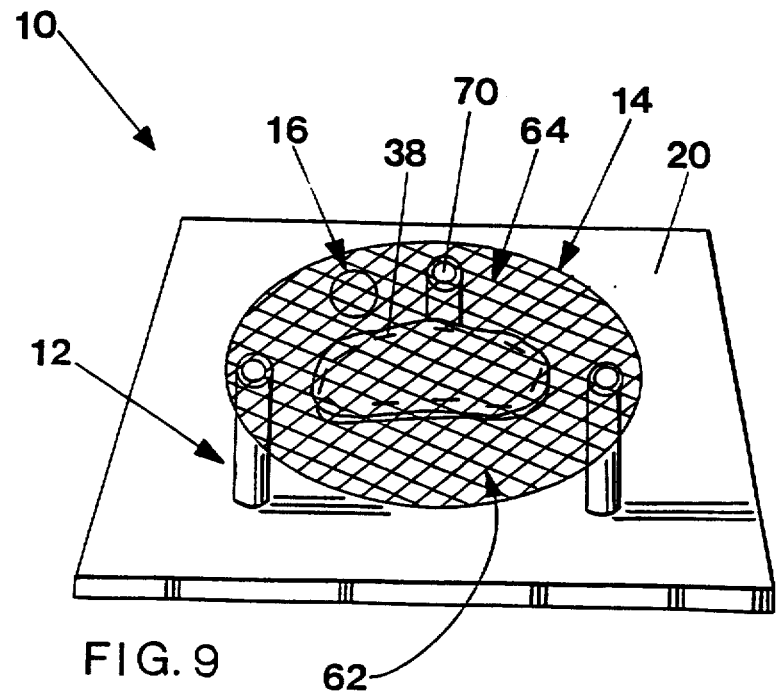
Figure 10:
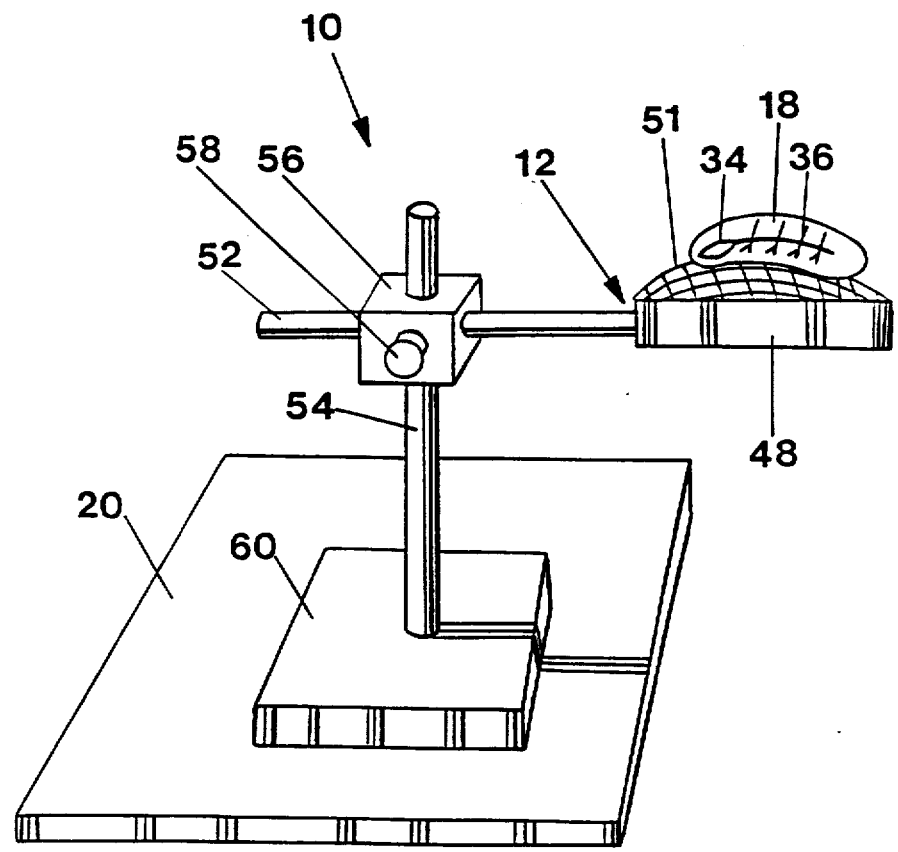
Figure 11:
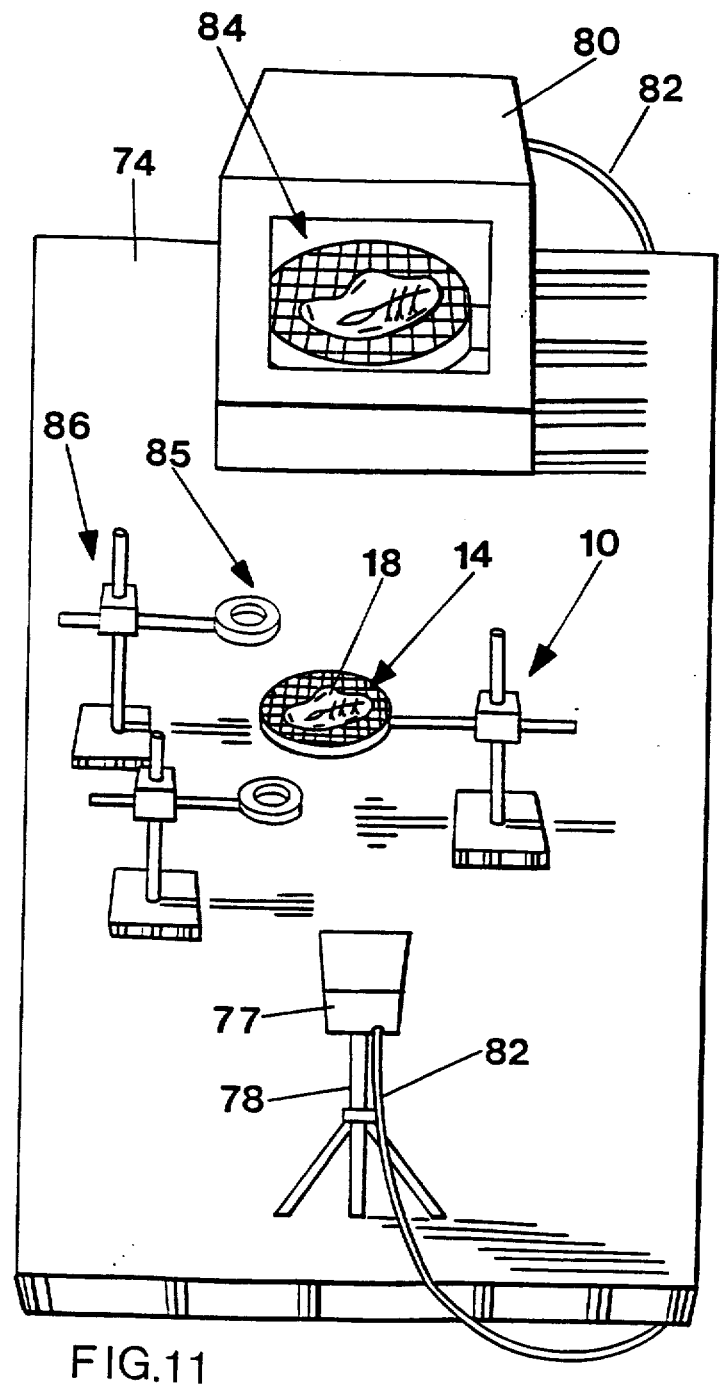

Regardless of the precise structure and configuration of mounting member 12, the embodiments of FIGS. 1-5 are assembled by inserting each tissue supporting member edge 30 into each channel 28. Typically, tissue supporting member 14 is a rectangular sheet of a plastic or a semi-rigid mesh having an edge width dimension which permits insertion of the edge into the channel. In the preferred embodiments, tissue supporting member 14 is a self-supporting material which maintains a concave (FIG. 1) or convex (FIGS. 2 and 4) configuration when mounted in the mounting member. However, tissue supporting member 14 also can be formed of a material which is not self-supporting, e.g., a soft mesh or woven material, with mounting member 12 adapted to maintain the mesh in a planar configuration by holding tissue supporting member 14 taut between an opposing pair of channels 28 (FIG. 3). For example, the embodiment of FIG. 3 can be assembled by pressing the opposing channels 28 toward one another into a "deformed position" and maintaining the pair of channels in the deformed position during insertion of each edge 30 into a corresponding channel. Edge 30 of the embodiment illustrated in FIG. 3 has a width dimension that is greater than the width of an opening 29 of channel 28. When the force used to maintain mounting member 12 in the deformed position is released, the mounting member resumes its original configuration and the tissue supporting member edge retained by the opposing channels is forced into a planar configuration. Accordingly, mounting member 12 preferably is formed of a material having sufficient elasticity to permit the above-described reversible deformation.

The tissue specimen 18 upon which surgical techniques, such as an incision 34 and a suture 36, are to be conducted is placed upon tissue supporting member 14 and is held in place at the plurality of anchoring sites 16. Various methods of attachment can be used to attach specimen 18 to the anchoring sites. In the embodiments illustrated in FIGS. 1 and 2, the anchoring sites comprise a plurality of intersections 46 of the mesh wires or semi-rigid filaments.

Figure 4:
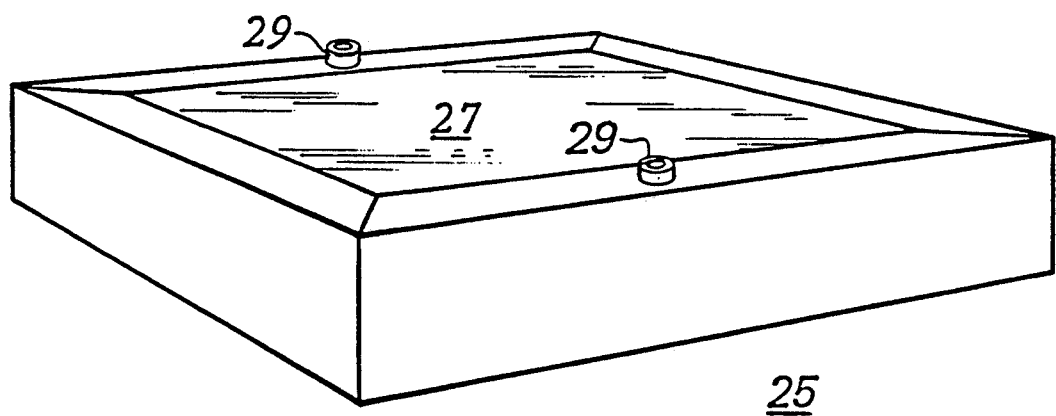
FIG. 4 is a schematic illustration of a second embodiment of the instant invention, shown with a convex non-mesh tissue supporting member and three tissue specimens attached thereto.
Figure 5:
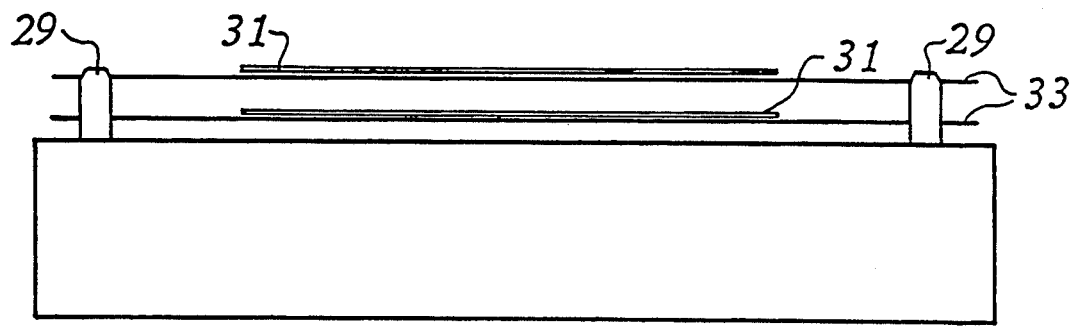
FIG. 5 is a schematic illustration of an alternative embodiment of the mounting member of the instant invention, shown without a tissue supporting member.

Various devices can be used to attach the tissue specimen to tissue supporting member 14. For example, FIG. 2 illustrates the use of staples 38 to attach specimen 18 to a mesh tissue supporting member. Alternatively, FIG. 4 illustrates the use of a fastener 40, including a hook portion 42 for grasping the specimen and an intermediate portion 44 contiguous therewith, for attaching each of three specimens 18 to the non-mesh tissue supporting member 14. For example, portion 44 can be an elastic band 47 or a spring 49. Inclusion of the elastic portion enables the fastener to be used to anchor tissue specimens of widely varying dimensions. Alternatively, portion 44 may be formed of a relatively rigid material. There is no requirement that fasteners 40 include portion 44. Accordingly, the instant invention also embraces fasteners 40 which comprise stationery hooks 45 directly attached to tissue supporting member 14.

Fasteners 40 are glued, welded or otherwise attached to the plurality of anchoring sites 16. As will be apparent to one of ordinary skill in the art, alternative fastening means can be attached to the plurality of anchoring sites without departing from the spirit and scope of the invention. Alternative structures for grasping the specimen, e.g., a spring clip 43, can be attached to supporting member 14 either directly or via a portion 44 without departing from the scope of the instant invention.

In a preferred embodiment, tissue supporting member 14 is supported by mounting member 12 in a manner which permits the user to adjustably position the tissue supporting member, thereby permitting placement of tissue specimen 18 at pre-selected angles and orientations with respect to horizontal surface 20. The embodiments of FIGS. 1–4 allow adjustable positioning of the tissue supporting member in at least three positions by placing one of walls 22, 24 and 26 in contact with horizontal surface 20. As shown in the figures, placement of side wall 26 in contact with surface 20 causes tissue supporting member 14 to be positioned in a substantially vertical, i.e., non-horizontal, plane. By turning mounting member 12 so that center wall 22 is in contact with surface 20, tissue supporting member 14 is positioned in a substantially horizontal plane. Walls 24 and 26 are optionally different lengths to permit positioning of the tissue supporting member at different angles with respect to the horizontal plane when mounting member 12 is positioned with one of walls 24, 26 in contact with the horizontal surface.

Figure 6:
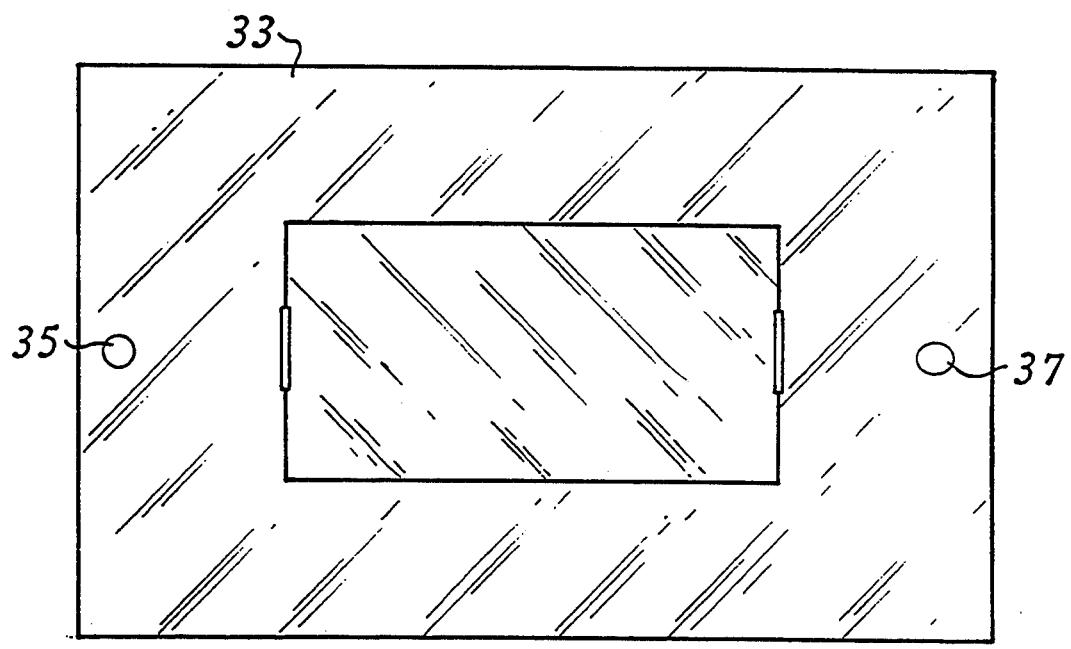
FIG. 6 is a schematic illustration of a third embodiment of the mounting member of the instant invention, shown with a mesh tissue supporting member attached to a support surface of the mounting member by use of a wire or thread.

Alternative preferred embodiments are adapted to permit adjustable positioning of the tissue supporting member in an incremental fashion (FIGS. 6–8 and 10–11). As illustrated in the figures, mounting member 12 includes a support element 48, such as an annular ring, adapted to maintain tissue supporting member 14 in a planar configuration. The tissue supporting member can be attached to support element 48 according to methods known to one of ordinary skill in the art. For example, FIG. 6 illustrates one method for attaching a mesh-type tissue supporting member to surface 14, wherein an elongated wire or thread 50 is wrapped around an annular ring support element 48 and through the mesh tissue supporting member to attach the mesh to the annular ring. As a result, tissue supporting member 14 is suspended in a planar configuration against support element 48. The ends of the wire or thread 50 are wrapped about an extension rod 52 attached to support element 48, adjacent to the point at which the rod connects to the surface. Subsequently, the ends of the wire or thread are secured using a twist or knot, or other like methods.

Figure 7:
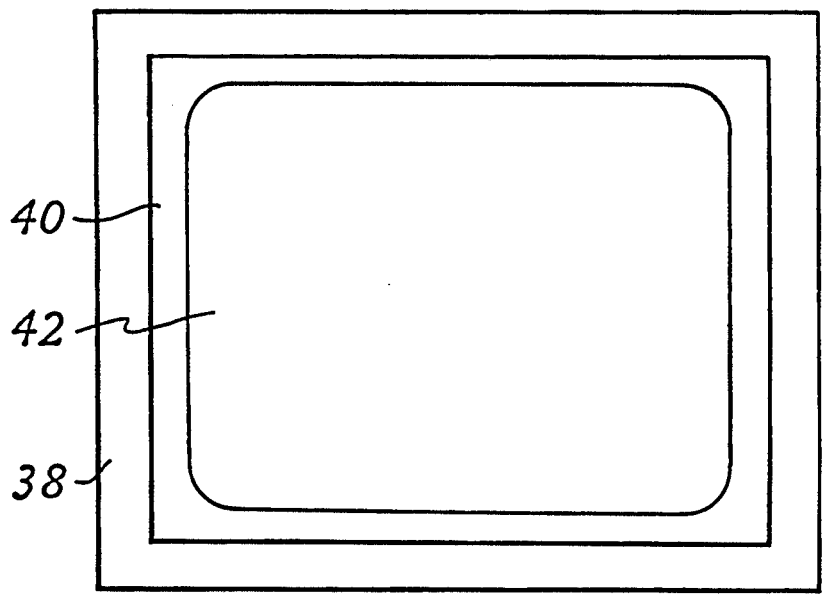
FIG. 7 is a schematic illustration of the embodiment of FIG. 6, shown with a mesh tissue supporting member attached to a support surface of the mounting member by an alternative method and having a tissue specimen attached thereto.

Alternatively, tissue supporting member 14 can be attached to support element 48 by any means that produces stability, while still allowing flexibility of the tissue supporting member. Methods for adhering or securing the tissue supporting member to the mounting member include methods employing welding or adhesive means for attachment (FIG. 7). If desired, a temporary contact can be achieved using a peg and hole system, velcro, magnets, or other like methods.

Figure 8:
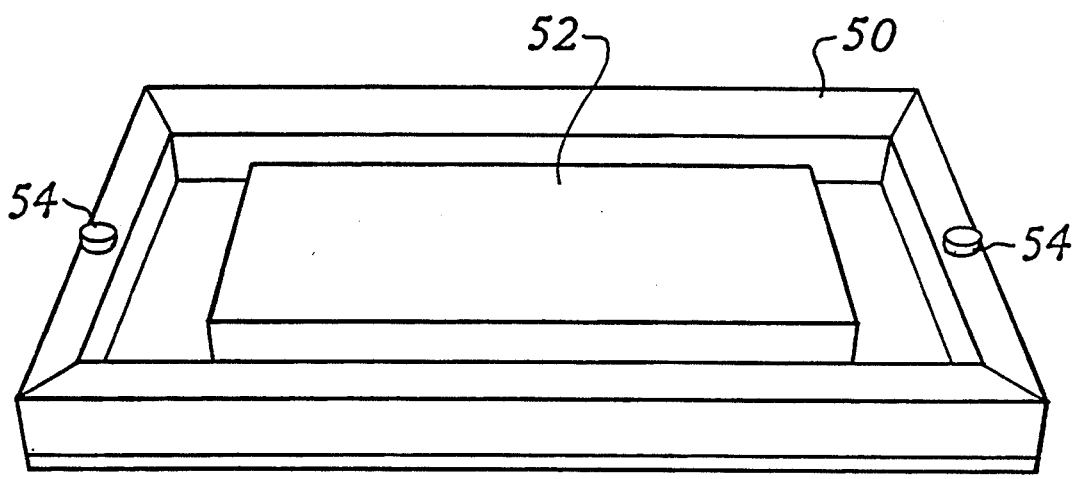
FIG. 8 is a schematic illustration of the embodiment of FIG. 6, shown with a non-mesh, planar tissue supporting member and having a tissue specimen attached thereto.
Figure 10:
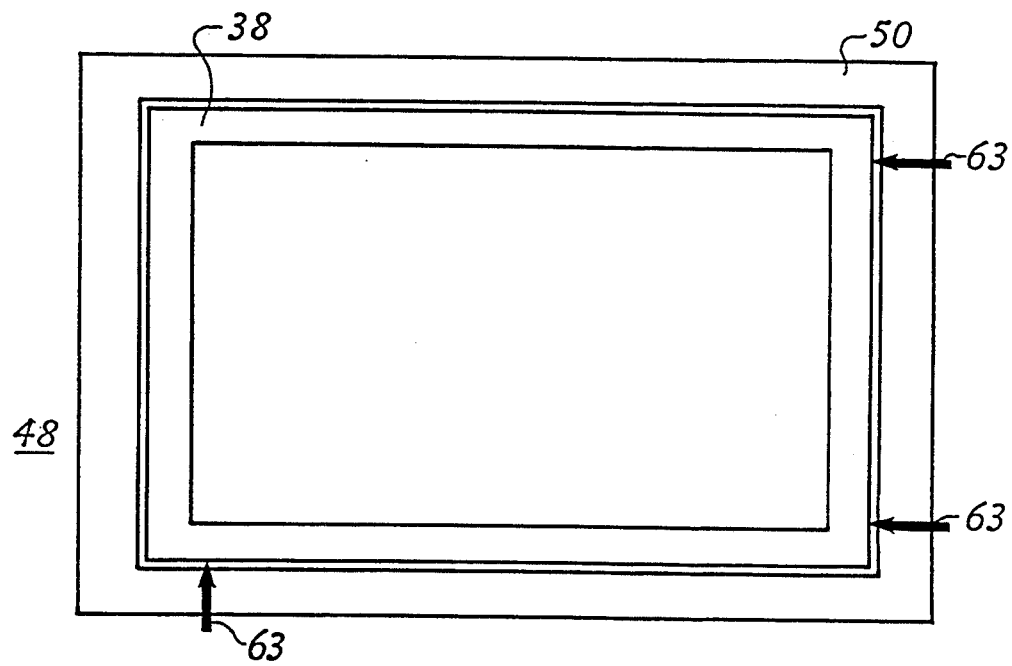
FIG. 10 is a schematic illustration of the embodiment of FIG. 6, shown with a mesh, non-planar tissue supporting member and having a tissue specimen attached thereto.

Tissue specimen 18 can be secured to tissue supporting member 14 by any of a variety of methods, including stapling the specimen to a mesh-type support using staples 38 (FIG. 7) or by employing a plurality of fasteners 40 (FIG. 8). Other methods for attachment of a tissue specimen to tissue supporting member 14 will be apparent to one of ordinary skill in the art. A comparison of FIGS. 7, 8 and 10 further illustrates the use of planar (FIGS. 7 and 8) and non-planar (FIG. 10) tissue supporting members for suspending tissue specimen 18. In particular, FIG. 10 illustrates a non-planar mesh 51 for suspending the tissue specimen in a non-planar configuration.

Extension rod 52 optionally is attached to support element 48 such that the support element can be mounted to a suitable support rod 54 as depicted in FIGS. 6–8 and 10–11. Extension rod 52 is mounted to the supporting rod by a standard laboratory coupler 56 that, by means of a set-screw 58, allows annular ring support element 48 to be moved up and down in a vertical plane, horizontally in a circular arc, and inwardly and outwardly in a radial direction. Supporting rod 54 is typically attached to a base 60 which may, in turn, be affixed to horizontal surface 20.

Support element 48 and extension rod 52 connected thereto can be constructed and arranged in a wide variety of configurations. For example, either one or both of support element 48 and extension 52 rod may have a circular cross-section or, alternatively, they may have square, rectangular, triangular, or other cross-sections. In addition, element 48, although typically a circular annular ring, may, if preferred, define a square, rectangular, triangular or other aperture. In addition, although coupler 56 depicted in FIGS. 6–8 and 10–11 comprises a generally cube-shaped device having non-intersecting perpendicular holes drilled therethrough for engaging a pair of rods in an orthogonal relationship, any of a wide variety of coupling devices adapted to achieve the same function may be substituted. Furthermore, supporting rod 54 need not be affixed to base 60. For example, if it is desired that the supporting rod be moveable, a standard "C-clamp" or suction device may be used to attach the support element to an alternative base or surface. In addition, if the physician is willing to sacrifice the ability to reposition support element 48 in the radial direction, the support element may include a means for directly attaching support element 48 to rod 54, thereby eliminating extension rod 52.

Figure 9:
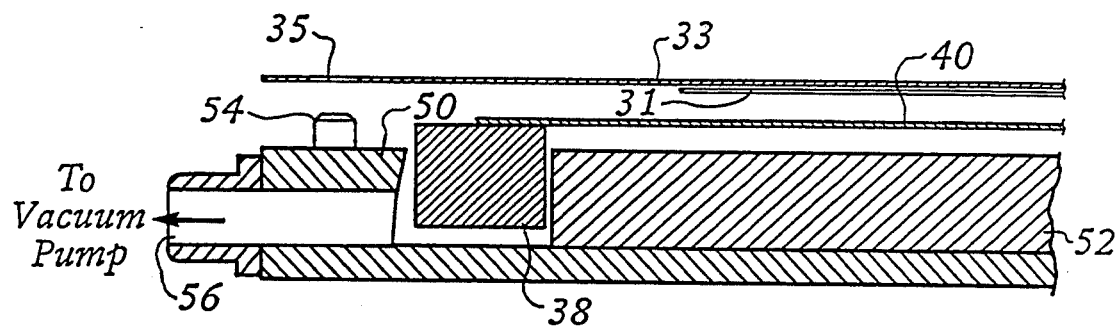
FIG. 9 is a schematic illustration of a fourth embodiment of the mounting member, shown with a self-supporting mesh tissue supporting member and a tissue specimen attached thereto.

FIG. 9 illustrates yet another embodiment of a tissue suspension device in which mounting member 12 is a plurality of legs which retain tissue supporting member 14 in a planar configuration. In use, the tissue specimen is secured to an underside 62 of the tissue supporting member to permit, for example, simulated repair of an anterior abdominal wall hernia. Alternatively, the tissue sample can be placed on a top side 64 of the tissue supporting member for simple suture practice. The tissue specimen is secured to the tissue supporting member by any of the above-mentioned securing methods.

Further in reference to FIG. 9, tissue supporting member 14 comprises a self-supporting material, such as a semi-rigid mesh. Each leg 12 includes a top portion adapted to engage the tissue supporting member. The tissue supporting member can be attached to the plurality of legs according to methods known to one of ordinary skill in the art, including the use of welding and gluing, or the above-described methods of temporary attachment. In the embodiment shown in FIG. 9, a broad head nail 70 is used to secure tissue supporting member 14 to each leg 12.

The instant invention can be used in combination with the laparoscopic training device disclosed in U.S. patent application Ser. No. 07/923,221 to create a training system for teaching laparoscopic techniques. Briefly, the training system comprises at least one aperture defining means 85 and a support means 86 for allowing the aperture defining means to be positioned above tissue specimen 18 in a manner which simulates a surgical opening in a laparoscopic surgical procedure. The tissue specimen is held in various positions and angles by attaching the tissue specimen to the tissue suspension device of the instant invention 10. By combining the aperture-defining means of the related co-pending application with the tissue suspension device disclosed herein, the training system provides the surgeon with a device which more closely simulates actual laparoscopic procedures in comparison with existing training devices.

Figure 11:
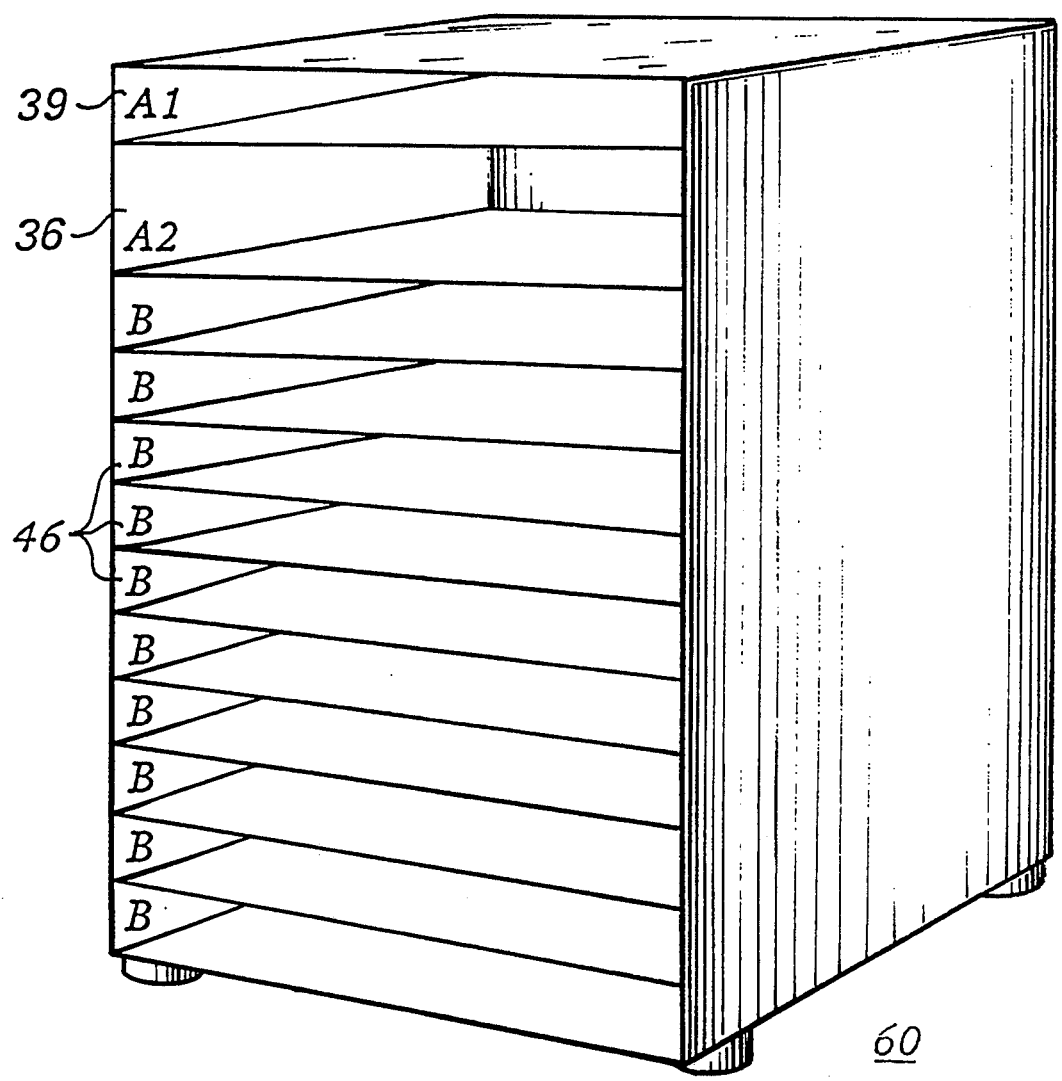
FIG. 11 is a schematic illustration of a laparoscopic training system showing the embodiment of FIG. 6 and its relationship to a plurality of laparoscopic training devices.
Figure 12A:
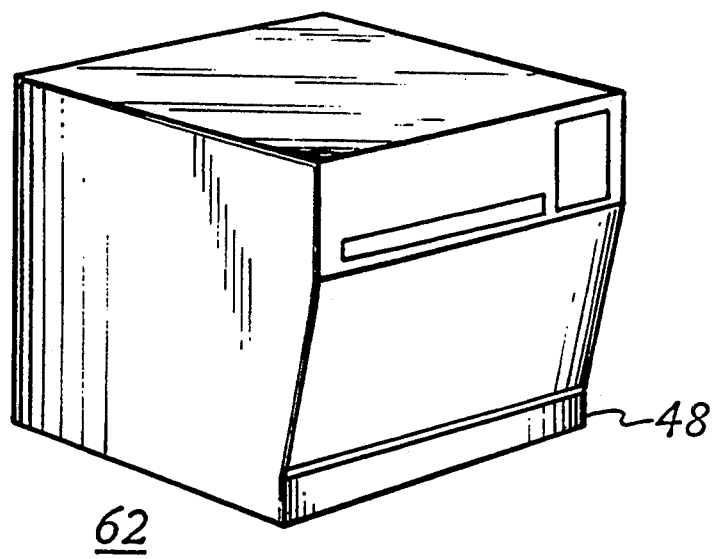
Figure 12B:
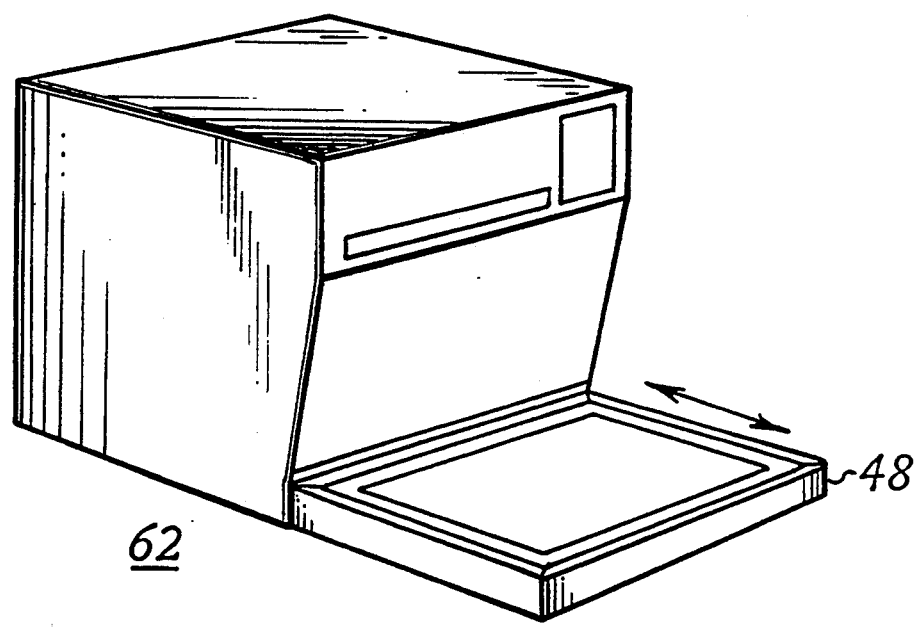
Figure 13A:
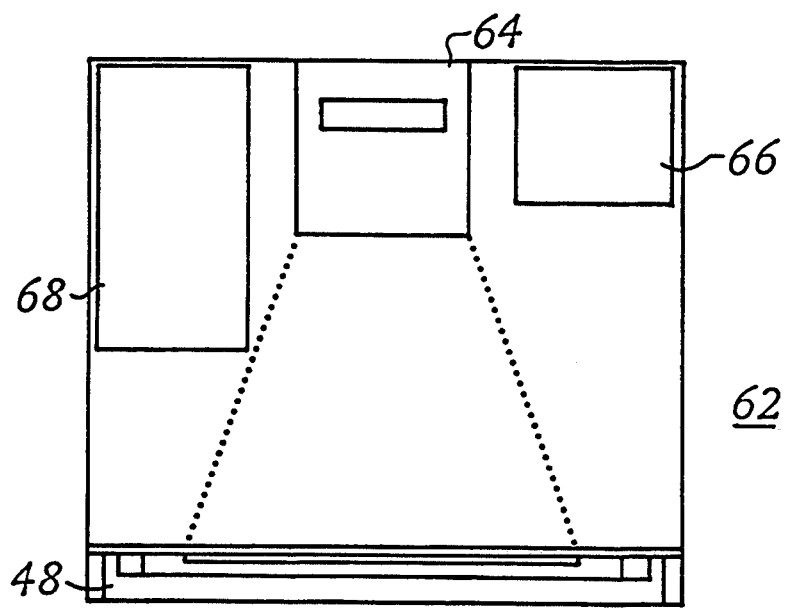
Figure 13B:
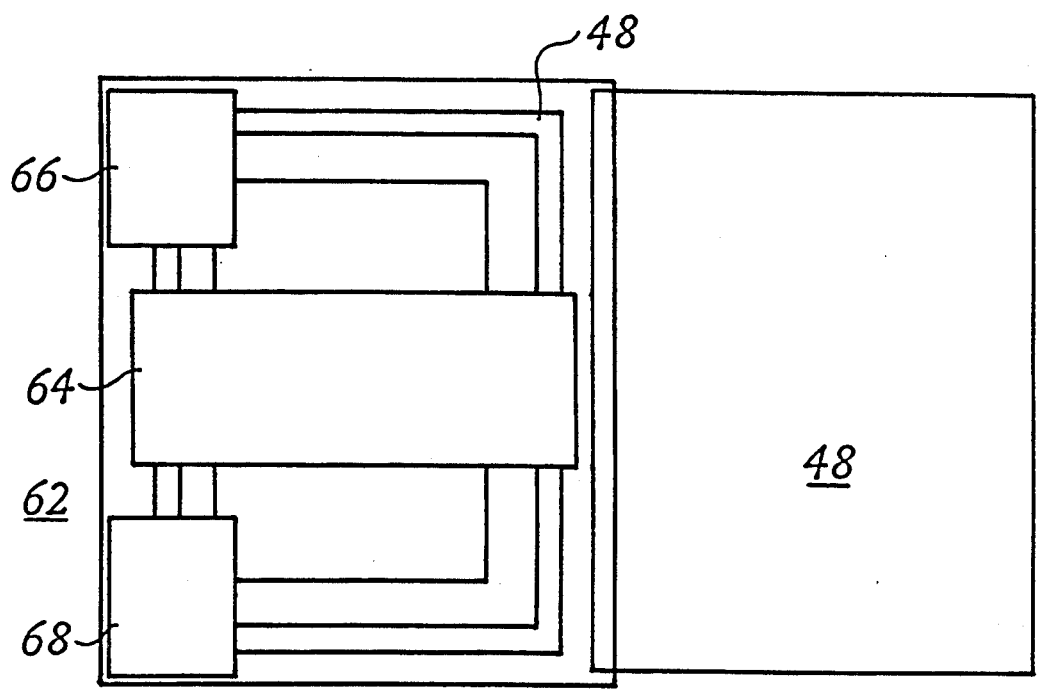
Figure 14:
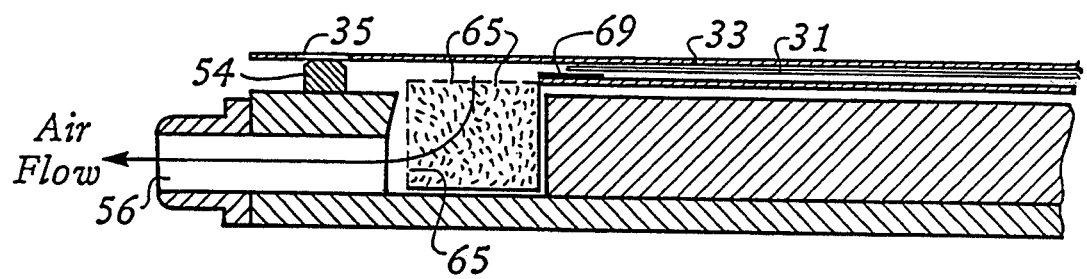
Figure 15:
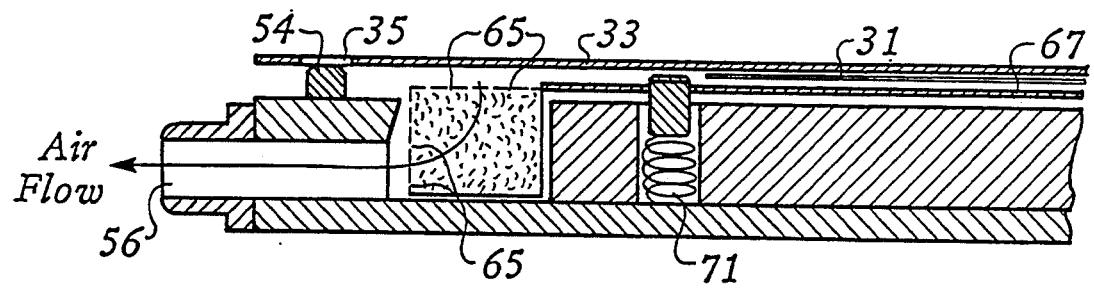
Figure 16:
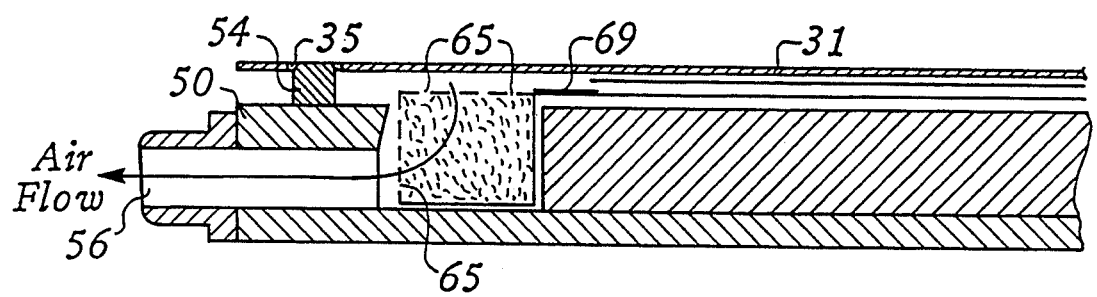
Figure 17:
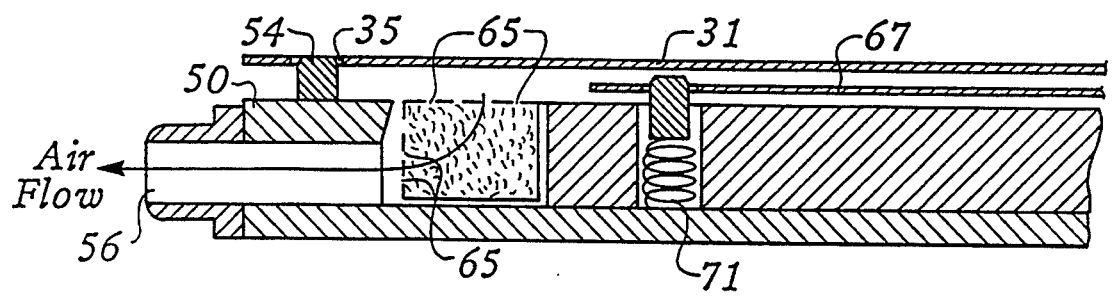

A schematic example of a complete laparoscopic training system is depicted in FIG. 11, wherein tissue suspension device 10 is positioned upon a table Surrounding the tissue suspension device are a plurality of aperture defining means 85 as disclosed in the above-identified co-pending application. The plurality of aperture defining means 85 have been configured to create a phantom abdominal wall above tissue specimen 18 in a configuration that simulates the spacing and positioning of such apertures if surgically produced in an actual patient. A television camera 77 mounted on a moveable base 78 such as a tripod and connected to a video monitor 80 by means of a cable 82 is oriented to photograph the specimen at an angle corresponding to the angle which would be seen during an actual laparoscopic surgical procedure if a video telescope were inserted into a patient through an appropriate surgical opening. However, since the present apparatus does not enclose the specimen, an image 84 can be provided to video monitor 80 using a regular camera, thereby allowing the physician to simulate actual surgical conditions without the need to employ a surgical telescope. Visualization of the surgical specimen can be by direct line of vision or by indirect means using the video camera aimed at the surgical specimen and attached to a video monitor as in an actual laparoscopic procedure. Of course, it should be noted that the configuration depicted in FIG. 11 is merely one representation of the numerous uses and configurations of the subject laparoscopic training device. The invention is not intended to be limited solely to the use of multiple apertures and a video camera, but rather, may consist simply of a single aperture defining means as described previously in the above-identified co-pending application.

EQUIVALENTS

Although specific features of the invention are included in some embodiments and drawings and not others, it should be noted that each feature may be combined with any or all of the other features in accordance with the invention.

As will be apparent to one of ordinary skill in the art, other methods, in addition to those illustrated in the figures, for retaining a sheet of flexible material in a mounting member are possible without undue experimentation. Accordingly, the combination of a pair of opposing channels for retaining an inserted edge of the tissue supporting member is illustrative only and is not intended to limit the scope of the instant invention. Key to the instant invention is a device which permits the positioning of a tissue sample in a manner which approximates the angles and positions of tissue encountered by the surgeon during performance of actual laparoscopic procedures. Thus, the precise structure and/or configuration of a device for mounting a tissue supporting member to achieve that objective should not be construed as a limitation of the instant invention.

It should be understood, that the foregoing description of the invention is intended merely to be illustrative thereof, the illustrative embodiments are presented by way of example only, and that other modifications, embodiments, and equivalents may be apparent to those skilled in the art without departing from its spirit.

Having thus described the invention, what I desire to claim and secure by Letters Patent is:

1. A tissue specimen suspension device comprising,
  a tissue supporting member comprising a mesh material having a plurality of anchoring sites;
  a mounting member adapted to engage the supporting member, the mounting member constructed and arranged to adjustably position the tissue supporting member; and
  a means for affixing the tissue specimen to said anchoring site of said tissue supporting member.

2. A tissue specimen suspension device as claimed in claim 1, wherein said mesh material is a self-supporting material.

3. A tissue specimen suspension device as claimed in claim 1, wherein said mounting member is adapted to allow removal of said tissue supporting member.

4. A tissue specimen suspension device as claimed in claim 1, wherein said mounting member includes a pair of opposing channels, each channel constructed and arranged to receive and retain an edge of said tissue supporting member.

5. A tissue specimen suspension device as claimed in claim 2, wherein said mounting member comprises a substantially vertical support and a surface defining means moveably mounted to said vertical support, and wherein said tissue supporting member is attached to said surface defining means.

6. A tissue specimen suspension device as claimed in claim 5, wherein said surface defining member includes an aperture.

7. A tissue specimen suspension device as claimed in claim 2, wherein said mounting member positions said tissue supporting member in a horizontal plane.

8. A tissue specimen suspension device as claimed in claim 2, wherein said mounting member positions said tissue supporting member in a non-horizontal plane.

9. A tissue specimen suspension device comprising,
a tissue supporting member comprising a flexible substrate having a plurality of anchoring sites;
a mounting member adapted to engage the supporting member, the mounting member constructed and arranged to adjustably position the tissue supporting member; and
a means for affixing the tissue specimen to said anchoring site of said tissue supporting member, wherein said means for affixing the tissue specimen comprises a hook.

10. A tissue specimen suspension device comprising,
a tissue supporting member comprising a mesh material having a plurality of anchoring sites;
a mounting member adapted to engage the supporting member, the mounting member constructed and arranged to maintain the tissue supporting member in a planar configuration; and
a means for affixing the tissue specimen to said anchoring site of said tissue supporting member.

11. A tissue specimen suspension device as claimed in claim 10, wherein said mesh material is a self-supporting material.

12. A tissue specimen suspension device as claimed in claim 10, wherein said mounting member is adapted to allow removal of said tissue supporting member.

13. A tissue specimen suspension device as claimed in claim 10, wherein said mounting member includes a pair of opposing channels, each channel constructed and arranged to receive and retain an edge of said tissue supporting member.

14. A tissue specimen suspension device as claimed in claim 10, wherein said mounting member adjustably positions said tissue supporting member.

15. A tissue specimen suspension device as claimed in claim 14, wherein said mounting member positions said tissue supporting member in a horizontal plane.

16. A tissue specimen suspension device as claimed in claim 14, wherein said mounting member positions said tissue supporting member in a non-horizontal plane.

17. A tissue specimen suspension device as claimed in claim 10, wherein said mounting member comprises a substantially vertical support and a surface defining member moveably mounted to said vertical support, and wherein said tissue supporting member is attached to said surface defining member.

18. A tissue specimen suspension device as claimed in claim 17, wherein said surface defining member includes an aperture.

19. A tissue specimen suspension device comprising,
a tissue supporting member comprising a flexible substrate having a plurality of anchoring sites;
a mounting member adapted to engage the supporting member, the mounting member constructed and arranged to maintain the tissue supporting member in a planar configuration; and
a means for affixing the tissue specimen to said anchoring site of said tissue supporting member, wherein said means for affixing the tissue specimen comprises a hook.

20. A tissue specimen suspension device comprising,
a tissue supporting member comprising a mesh material having a plurality of anchoring sites;
a mounting member adapted to engage the supporting member, the mounting member constructed and arranged to maintain the tissue supporting member in a non-planar configuration; and
a means for affixing the tissue specimen to said anchoring site of said tissue supporting member.

21. A tissue specimen suspension device as claimed in claim 20, wherein said mounting member is adapted to allow removal of said tissue supporting member.

22. A tissue specimen suspension device as claimed in claim 20, wherein said mounting member includes a pair of opposing channels, each channel constructed and arranged to receive and retain an edge of said tissue supporting member.

23. A tissue specimen suspension device as claimed in claim 20, wherein said mounting member adjustably positions said tissue supporting member.

24. A tissue specimen suspension device as claimed in claim 20, wherein said mesh material is a self-supporting material.

25. A tissue specimen suspension device comprising,
a tissue supporting member comprising a flexible substrate having a plurality of anchoring sites;
a mounting member adapted to engage the supporting member, the mounting member constructed and arranged to maintain the tissue supporting member in a non-planar configuration; and
a means for affixing the tissue specimen to said anchoring site of said tissue supporting member wherein said means for affixing the tissue specimen comprises a hook.

26. A tissue specimen suspension device comprising,
a tissue supporting member comprising a mesh material having a plurality of anchoring sites, the anchoring sites adapted to maintain the tissue specimen on an underside of said tissue supporting member;
a mounting member adapted to engage the tissue supporting member, the mounting member constructed and arranged to maintain the tissue supporting member in a planar configuration; and
a means for affixing the tissue specimen to said anchoring site of said tissue supporting member.

27. A tissue specimen suspension device as claimed in claim 26, wherein said mounting member comprises a plurality of legs, each leg constructed and arranged to engage said tissue supporting member.

28. A tissue specimen suspension device as claimed in claim 26, wherein said mesh material is a self-supporting material.

29. A tissue specimen suspension device comprising,
- a tissue supporting member comprising a flexible structure having a plurality of anchoring sites, the anchoring sites adapted to maintain the tissue specimen on an underside of said tissue supporting member;
- a mounting member adapted to engage the tissue supporting member, the mounting member constructed and arranged to maintain the tissue supporting member in a planar configuration; and
- a means for affixing the tissue specimen to said anchoring site of said tissue supporting member, wherein said means for affixing the tissue specimen comprises a hook.

30. A training system for teaching laparoscopic techniques, comprising,
- at least one aperture defining means and a means for allowing the aperture defining means to be positioned above a tissue specimen in a manner which simulates a surgical opening in a laparoscopic surgical procedure; and
- a tissue suspension device including a tissue supporting member comprising a flexible substrate having a plurality of anchoring sites,
- a mounting member adapted to engage the supporting member, the mounting member constructed and arranged to adjustably position the tissue supporting member, and
- a means for affixing the tissue specimen to said anchoring site of said tissue supporting member, wherein said means for affixing the tissue specimen comprises a hook.

* * * * *

UNITED STATES PATENT AND TRADEMARK OFFICE
CERTIFICATE OF CORRECTION

PATENT NO : 5,358,408

DATED : October 25, 1994

INVENTOR(S) : Marelyn Medina

It is certified that error appears in the above-identified patent and that said Letters Patent is hereby corrected as shown below:

The title page showing the illustrative figure should be deleted to be replaced with the attached title page.

Drawings:

The sheet of drawings consisting of Figs. 1-17 should be deleted to be replace with Figs. 1-11 as shown on attached sheets.

Signed and Sealed this

Twenty-eight Day of February, 1995

Attest:

BRUCE LEHMAN

Attesting Officer      Commissioner of Patents and Trademarks

United States Patent [19]

Medina

[11] Patent Number: 5,358,408

[45] Date of Patent: Oct. 25, 1994

[54] TISSUE SPECIMEN SUSPENSION DEVICE

[76] Inventor: Marelyn Medina, 81 Browning Ave., Nashua, N.H. 03062

[21] Appl. No.: 28,325

[22] Filed: Mar. 9, 1993

[51] Int. Cl.⁵ .............................................. G09B 23/28
[52] U.S. Cl. .................................. 434/262; 434/267
[58] Field of Search ........................ 434/262, 267, 269

[56] References Cited

U.S. PATENT DOCUMENTS

| | | | |
|---|---|---|---|
| 3,339,290 | 9/1967 | Doyle | 434/267 |
| 3,775,865 | 12/1973 | Rowan | 434/262 |
| 4,001,952 | 1/1977 | Kleppinger | 434/262 |
| 4,789,340 | 12/1988 | Zikria | 434/272 |
| 5,149,270 | 9/1992 | McKeown | 434/262 |
| 5,230,630 | 7/1993 | Burgett | 434/262 |

OTHER PUBLICATIONS

R. W. Baily, M.D., A. L. Imbembo, M.D. and K. A. Zuker, M.D., *Establishment of a Laparoscopic Cholecystectomy Training Program* pp. 231–236, The American Surgeon, Apr. 1991, vol. 57.

A. G. Gordon and A. L. Magos, *The Development of Laparoscopic Surgery*, Bailliere's Clinical Obstetrics and Gynecology, vol. 3, No. 3 pp. 429–448, Sep. 1988.

G. Berci, J. M. Sackier, and M. Paz-Patlow, *New Ideas and Improved Instrumentation for Laparoscopic Cholecystectomy*, pp. 1–3 Surgical Endoscopy, (1991) 5: 1–3.

B. Buess, M. Naruhn, Th. Mötzung, B. Mentges and H. D. Becker, *Trainingsprogram fur die Minimal-invasive Chirugie* pp. 276–283 Chirurg vol. 62, (1991).

*Primary Examiner*—Gene Mancene
*Assistant Examiner*—Cindy A. Cherichetti
*Attorney, Agent, or Firm*—Wolf, Greenfield & Sacks

[57] ABSTRACT

A device for assisting in the training of laparoscopic surgical techniques is disclosed. The device allows placement of a tissue specimen in different positions and angles that permit the surgeon to practice laparoscopic techniques such as suturing and stapling during laparoscopic simulation exercises.

30 Claims, 11 Drawing Sheets

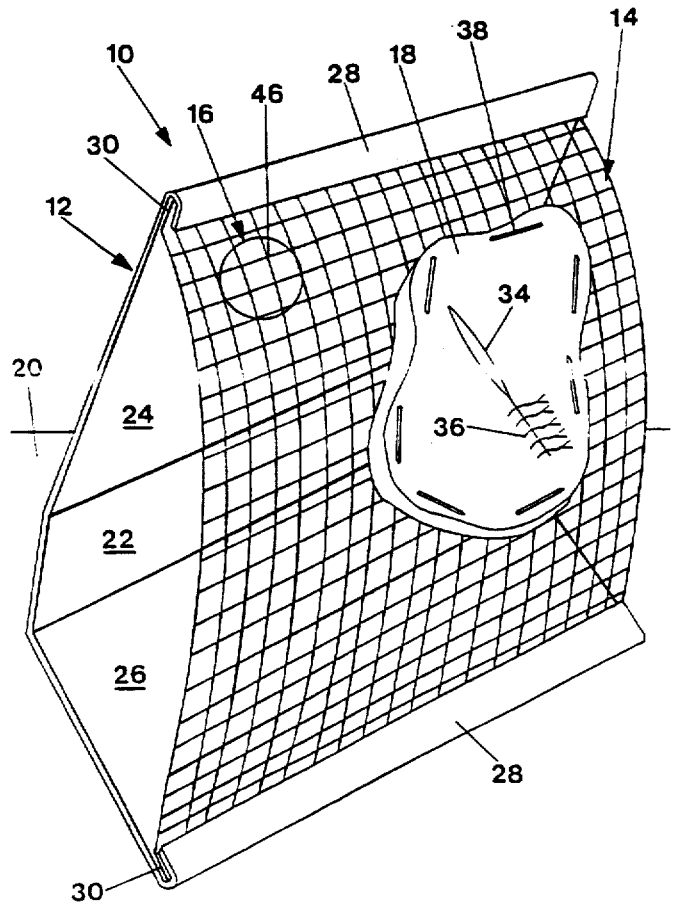

Patent No. 5,358,408